Figures 1, 2:
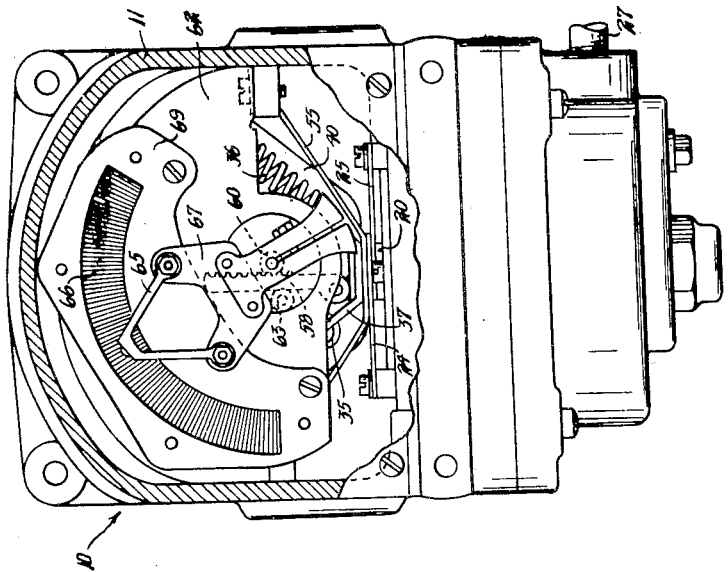

Oct. 18, 1949.　　　　　S. CRUM　　　　　2,485,433
PRESSURE RESPONSIVE DEVICE

Filed April 4, 1946　　　　　　　　　　　　　3 Sheets-Sheet 1

INVENTOR.
STEPHEN CRUM

BY

George H. Fisher
ATTORNEY

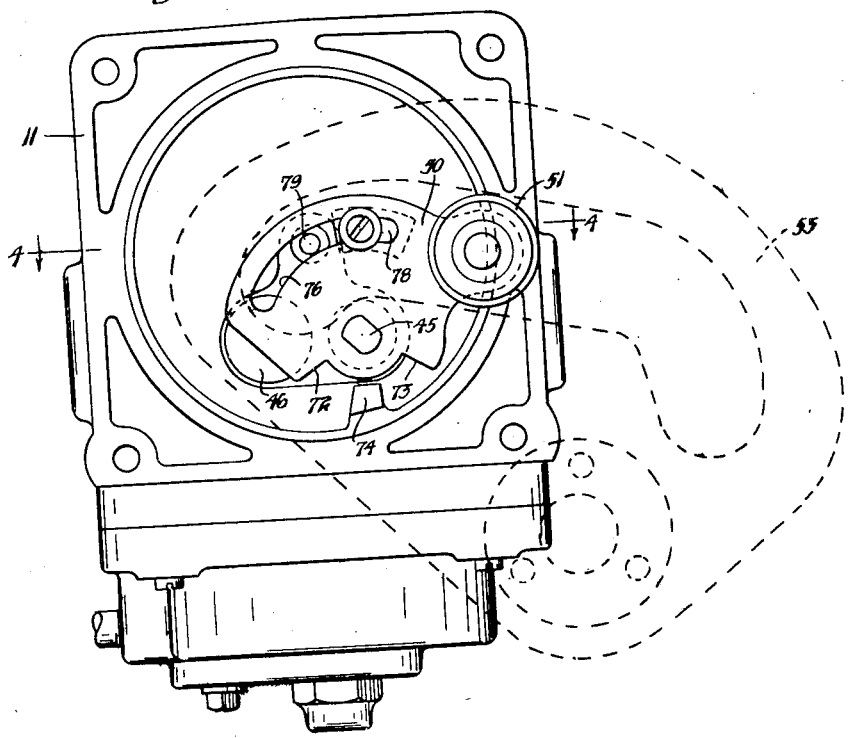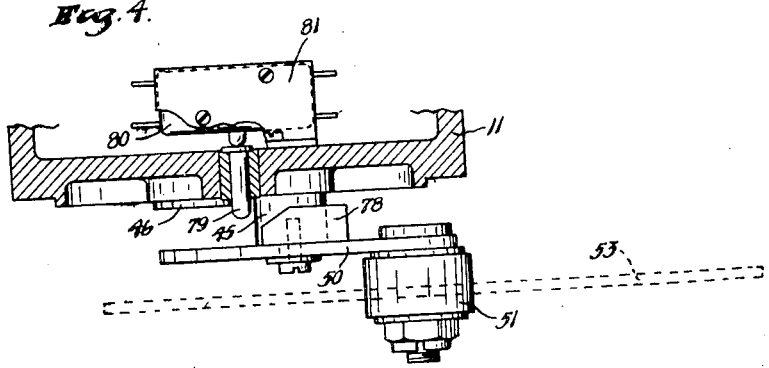

Oct. 18, 1949.　　　　　　S. CRUM　　　　　　2,485,433
PRESSURE RESPONSIVE DEVICE
Filed April 4, 1946　　　　　　　　　　　　3 Sheets-Sheet 3

INVENTOR.
STEPHEN CRUM
BY
George N. Fisher
ATTORNEY

Patented Oct. 18, 1949

2,485,433

UNITED STATES PATENT OFFICE 2,485,433

PRESSURE RESPONSIVE DEVICE

Stephen Crum, Minneapolis, Minn., assignor to Minneapolis-Honeywell Regulator Company, Minneapolis, Minn., a corporation of Delaware Application April 4, 1946, Serial No. 659,653

14 Claims. (Cl. 201—48)

1

The present invention relates to pressure responsive devices and more particularly to a manifold pressure control for internal combustion aircraft engines.

In my co-pending application entitled "Engine power control apparatus," Serial No. 659,651, filed on even date herewith, is disclosed apparatus for coordinating engine speed and intake manifold pressure to obtain desired operating conditions for the various power requirements of an aircraft. The present invention is directed specifically to a pressure responsive device suitable for use with that apparatus.

In modern aircraft engines employing superchargers driven by exhaust gas it is desirable to select manually the required intake manifold pressure corresponding to the required power output of an engine, and to employ a pressure responsive control device for positioning the throttle valve and turbine waste gate to positions that give the desired manifold pressure.

As in other automatic control systems, a balance is desired between control sensitivity, which is desirable, and unstable operation or hunting, which is undesirable. It has been found that the above mentioned airplane engine manifold pressure control system is more stable in its operation at the lower power requirements than at high power, and it is therefore possible to employ a more sensitive control at the lower power settings, as has been pointed out in my aforementioned application, Serial No. 659,651.

It is an object of the invention, therefore, to provide a pressure responsive device that is more sensitive to pressure changes at low values of pressure than at higher pressures.

In order to maintain desired manifold pressure at higher altitudes it is necessary to run the turbine waste gate toward closed position thereby increasing the amount of supercharging. A device responsive only to manifold pressure would accomplish this only in response to some decrease in manifold pressure. It is desirable to maintain the manifold pressure substantially constant regardless of altitude, especially at maximum or "military" power setting.

It is accordingly a further object of the invention to provide a pressure responsive device in which ambient pressure will shift the control point at which the primary control pressure actuates the device.

When the engine is being idled, there is no actual power requirement, and it is desirable that the turbine waste gate be fully open and that the throttle be moved very nearly closed regardless of manifold pressure. It is, therefore, a

2 further object to provide means for biasing the pressure sensitive element toward a position corresponding to high manifold pressure when the device is set for idling operation.

My aforementioned co-pending application, Serial No. 659,651, describes the desired relation between propeller speed and manifold pressure for normal flight conditions.

Under some flight conditions it is desirable to adjust the relation between engine speed and manifold pressure to other than the normal schedule, but it is essential that the system be restored to normal condition when entering the maximum power range.

An additional object, then, is to provide a pressure responsive device including auxiliary switching means actuated as the device is set for pressures near one extremity of its range.

Figure 5:
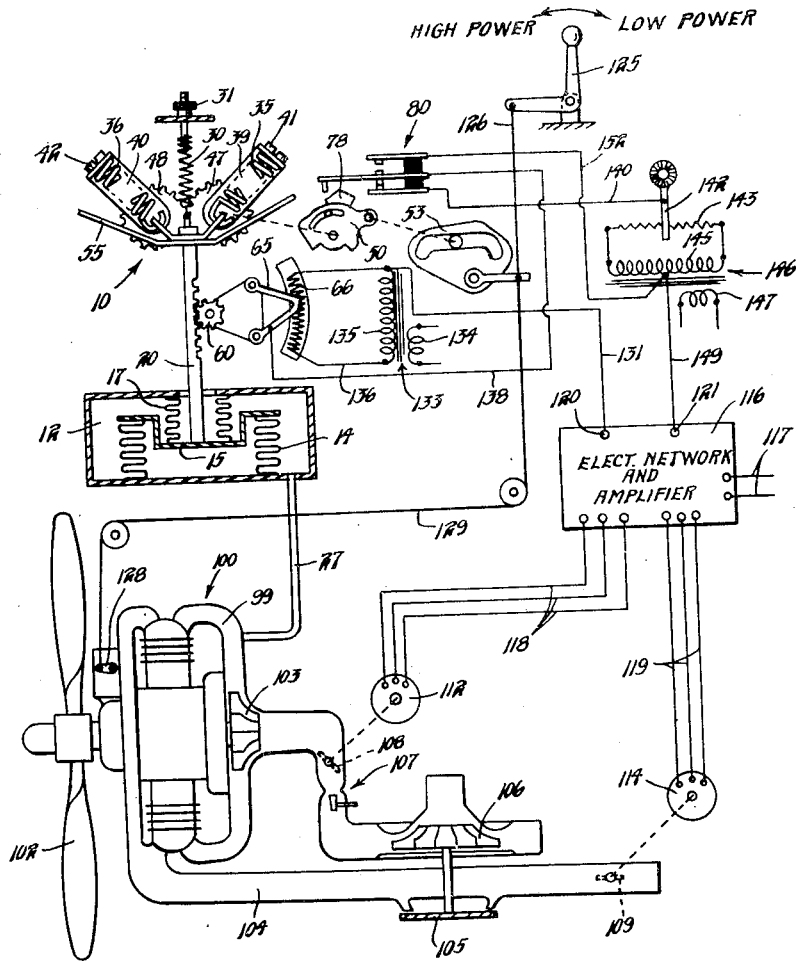

Further objects will be apparent from the appended claims and from the specification and drawing, in which Figure 1 is a sectional elevation of a pressure responsive device incorporating various features of the invention, Figure 2 is an elevation, partly in section, of the device of Figure 1 but showing a variable resistance actuated by the mechanism appearing in Figure 1, Figure 3 is an elevation showing the reverse side of the device of Figures 1 and 2, Figure 4 is a fragmentary section taken substantially on line 4—4 of Figure 3, and Figure 5 is a diagrammatic showing of a system employing the device illustrated in Figures 1 to 4, inclusive.

Referring now to the drawing, a pressure responsive controller 10 is illustrated in Figures 1 to 4 and includes a housing 11 which serves to support the various elements of the device. The lower portion of the housing 11 is shaped to provide a chamber 12 to the lower wall of which is secured an aneroid bellows 14 having a movable wall 15. A seal-off bellows 17 of somewhat smaller diameter than the bellows 14 closes an opening in the upper portion of the body 11 that forms the chamber 12. A member 20 that is connected to the movable wall 15 of the bellows 14 and also to the seal-off bellows 17 extends through the opening in the chamber 12. The member 20 is provided with a reduced portion 21 that cooperates with a plate 22 for limiting the extent of movement of the member 20. As seen in Figure 2, a pair of flexible reeds 24 and 25, each engaging the member 20 at one end and a portion of the housing 11 at the other end, serve to guide the member 20 as it is positioned vertically by the bellows 14 and 17.

A pressure connection 27 serves to transmit the control pressure to the chamber 12. It will be apparent that since the bellows 14 is of somewhat larger diameter than the bellows 17 an increase of pressure within the chamber 12 will move the bellows wall 15 downwardly and therefore the member 20 also.

The member 20 is urged upwardly against the pressure in the chamber 12 by a spring 30 that has its upper end attached to the housing 11 by an adjustable connection 31 that positions a screw 32 and a plug 33 which is threaded externally to engage the upper end of the spring 30. The spring 30 is arranged to urge the member 20 upwardly directly in line with its normal movement as determined by the bellows 14 and 17 and by the reeds 24 and 25. Adjustment of the spring 30 with respect to the housing 11 changes the force due to pressure in the chamber 12 necessary to move the bellows and member 20 downwardly, while adjustment of the spring 30 with respect to the plug 33 changes the rate of the spring 30.

Member 20 is also urged upwardly by a pair of springs 35 and 36 that are arranged symmetrically on either side of the member 20 and pivotally attached thereto by means of a bracket 37. The upper ends of the springs 35 and 36 are secured to the outer ends of spring support levers 39 and 40 by means of adjusting screws 41 and 42.

The initial spring rate of the springs 35 and 36 may be adjusted to a certain extent by varying the position of the outer ends thereof on externally threaded plugs 43 and 44 that are positioned with respect to the levers 39 and 40 by the adjusting screws 41 and 42.

The inner ends of the levers 39 and 40 are pivotally carried in the housing 11 on a pair of shafts 45 and 46. The shafts 45 and 46 are provided with intermeshing gears 47 and 48 for causing the levers 39 and 40 to move simultaneously. It will be noted that the arrangement is such that the levers 39 and 40 will be swung toward the vertical at the same time. The shaft 45 is provided with an adjusting lever 50 located outside the housing 11 as shown in Figures 3 and 4. A roller 51 pivoted in the lever 50 adapts the device for control by cam means 53 as will be pointed out hereinafter.

The effective spring rate of the control device at any particular setting of the levers 39 and 40 and therefore the sensitivity, will depend on the spring rates of the spring 30, springs 35 and 36 and also on the spring rates of the bellows 14 and 17. The overall effective spring rate of the device may be adjusted, for any particular position of the levers 39 and 40, by positioning the plug 33 with respect to the spring 30 and by positioning the plugs 43 and 44 with respect to the springs 35 and 36.

It will be apparent that the springs 35 and 36 exert their greatest force tending to reduce the size of the chamber 12 when the levers 39 and 40 are swung to a vertical position paralleling the fixed spring 30. As the levers 39 and 40 are swung away from the vertical position, the component of the force of the springs 35 and 36 acting vertically on the member 20 is reduced. It will be noted that the springs 35 and 36 are, in effect, pivoted at their lower ends substantially in line with the pivotal axes of the levers 39 and 40. For this reason, little or no force is required to position the levers 39 and 40, the change in force urging the member 20 upwardly being obtained by changing the effective component of the springs 35 and 36 in that direction.

It will be noted also that the springs 35 and 36 will have their greatest spring rate when they are adjusted to the vertical position. As they are swung away from the vertical their effective spring rate will diminish. In other words, when the springs 35 and 36 are swung outwardly, a relatively smaller force will be required to move the member 20 through a predetermined distance than when they are in a more nearly vertical position.

As seen in Figure 1, the member 20 is provided with a leaf spring 55 that extends upwardly at an angle beneath the springs 35 and 36. When the levers 39 and 40 are swung outwardly to a point near their extremity of motion, the springs 35 and 36 will engage the leaf spring 55 or the spring 55 may engage the ends of the levers 39 and 40 with the result that the member 20 will be biased downwardly with the same effect on the member 20 as though the pressure in the chamber 12 had increased. Adjustment of the levers 39 and 40 after engagement of the leaf spring 55 will therefore provide a varying degree of downward bias on the member 20. Obviously, the spring 55 could directly engage the levers 39 and 40 rather than the springs 35 and 36.

A rack 58 is pivoted in the member 20 and cooperates with a pinion 60 as indicated in dotted lines in Figure 2 that is rotatable with respect to a plate 62 that is, in turn, suitably supported in the housing 11. A roller 63 also pivoted in the plate 62 serves to keep the rack 58 in engagement with the pinion 60. The pinion 60 serves to position an arm 65 that engages and wipes over an electrical resistance 66. The arm 65 is provided with an electrical insulating portion 67 to isolate it electrically from the remainder of the device. Likewise, the electrical resistance 66 is mounted on an insulating plate 69 that is suitably secured to the plate 62.

Referring again to Figures 3 and 4, it will be seen that the adjusting lever 50 is provided with a pair of stops 72 and 73 that cooperate with a projection 74 on the housing 11. The stop 72 is provided to limit adjustment in the direction calling for maximum pressure and the stop 73 limits movement in the direction calling for minimum pressure.

The adjusting lever 50 is also provided with an arcuate slot 76 in which is adjustably mounted a cam 78. The cam 78 engages a plunger 79 for actuating a single pole double throw snap switch 80 that is mounted inside the housing 11 upon a bracket 81. The snap switch 80 may be of any suitable type which are well known and it is not thought necessary to describe the details thereof. It will be noted that by suitably adjusting the cam 78 in the slot 76 the switch 80 may be actuated at any desired position of the adjusting lever 50.

The roller 51 on the adjusting lever 50 may be positioned by a suitable cam 53 which has been illustrated as of the type employed in my co-pending application Serial No. 659,651, filed on even date herewith.

The operation of the device will be described in connection with the diagrammatic control system illustrated in Figure 5. The pressure responsive device 10 is here shown in a system for controlling the intake manifold pressure of an aircraft engine. The chamber 12 of the device is connected by means of the pressure connection 17 to the intake manifold 99 of an internal combustion aircraft engine 100. The engine 100 directly drives a propeller 102 and a direct driven blower 103 within the induction system. Exhaust from the engine 100 passing through an exhaust pipe 104 also drives a turbine 105 which rotates a second supercharger 106. The supercharger 106 conveys air to a carburetor 107 that includes a throttle valve 108. The amount of supercharging accomplished by the supercharger 106 depends on the position of a waste gate valve 109 located in the exhaust system beyond the turbine 105. The pressure within the intake manifold 99 will increase as the throttle valve 108 is opened and will be further increased as the waste gate valve 109 is moved toward closed position to force more exhaust gas through the turbine 105 and increase the speed of rotation of the supercharger 106.

A reversible electric motor 112 positions the throttle valve 108 and a reversible electric motor 114 positions the waste gate valve 109. A suitable electrical network and electronic amplifier 116 of the type described in my co-pending application Serial No. 659,651, filed on even date herewith, is supplied with power by the connection 117. The amplifier 116 is connected to the motor 112 by wires 118 and to the motor 114 by wires 119. The motors 112 and 114 sequentially open the throttle valve 108 and close the waste gate valve 109 with a small amount of overlap between the movements thereof as the alternating current voltage supplied to the input terminals 120 and 121 of the network and amplifier 116 is changed from a relatively high value to a relatively low value.

A lever 125 that corresponds to the usual throttle lever is located in the pilot's compartment. Adjustment of the lever 125 positions the cam 53 through a cable 126 and the cam 53 positions the roller 51 and the adjusting lever 50 thereby swinging the levers 39 and 40 to adjust the control point of the pressure responsive device 10. The lever 125 also adjusts a propeller speed control 128 on the engine 100 through the cable 126 and a cable 129. In the complete system described in my co-pending application Serial No. 659,651, filed on even date herewith, a more complete system for correlating the settings of the propeller speed control and the setting of the pressure responsive device is illustrated. It is sufficient here to show that the propeller speed control and the pressure responsive device are actuated by movements of the same manual control.

The input terminal 120 of the electrical network and amplifier 116 is connected to one end of the electrical resistance 66 of the pressure responsive device 10 by a wire 131. A transformer 133 having a primary winding 134 also includes a secondary 135, one end of which is connected to the wire 131 and the other end of which is connected to the opposite end of the electrical resistance 66 by a wire 136. The slider 65 cooperating with the resistance 66 is connected to the center pole of the switch 80 by means of a wire 138. The wire 138 is normally connected through the switch 80 to a wire 140 leading to a manually adjustable arm 142 that is positionable with respect to a resistance 143. The resistance 143 is connected across a secondary 145 of a transformer 146 having a primary winding 147. The midpoint of the secondary winding 145 is connected through a wire 149 to the other input terminal 121 of the electrical network and amplifier 116.

Assuming that the arm 142 is positioned in the mid-point of the resistance 143, the voltage applied to the input terminals 120 and 121 of amplifier 116 will depend entirely upon the position of the slider 65 with respect to the electrical resistance 66 of the pressure control device 10. If it is desired to change the relation between propeller speed and intake manifold pressure, the arm 142 may be manually positioned on the resistance 143 to superimpose an alternating current voltage on the voltage as determined by the pressure control device. The alternating current supplied to the primary windings of the transformers 133 and 146 bear a definite phase relation to each other so that adjustment of the arm 142 will have the effect of either adding to or subtracting from the voltage output as determined by the potentiometer comprising resistance 66 and slider 65 of the pressure control device. Under certain conditions of flight, this adjustment for variations from normal relation between propeller speed and manifold pressure may be desirable, but under military or emergency power conditions this effect must be eliminated or the result will either be insufficient manifold pressure to correspond to the propeller speed or a dangerously high manifold pressure.

The switch 80 serves to shunt the control afforded by the arm 142 and resistance 143 out of the system so that when the adjusting arm 50 is positioned so that the cam 78 engages the switch 80 the wire 138 will be connected directly to the amplifier input terminal 121 through a wire 152 and the wire 149 directly to the terminal 121, thus restoring the normal relationship between propeller speed and manifold pressure. It will be noted that the cam 78 is adjustable in the arm 50 so that normal operating conditions may be established at any desired position of the manually operated lever 125. This setting will depend upon experience with the particular type of aircraft involved.

Referring again to the pressure control device 10, it will be noted that the force opposing expansion of the chamber 12 and downward movement of the movable wall 15 is obtained by the single vertical spring 30 and by the pair of springs 35 and 36 which are simultaneously rotated to change the force component opposing the control pressure. When the springs 35 and 36 are parallel to the direction of bellows movement, the entire force of the springs will act on the bellows assembly, but as the springs are positioned through a greater angle their effective component will be reduced and the controlled pressure will be reduced due to repositioning of the throttle valve 108 and the waste gate valve 109. It will be noted that as the springs 35 and 36 are adjusted for lower control pressure the effective spring rate will also be reduced. When the spring rate is reduced, a smaller change in pressure is required to move the potentiometer slider 65 from one end of the resistance 66 to the other and therefore the device will be more sensitive. When the power plant is operating in the normal cruising or rated power range operation is somewhat more stable than in the emergency or military power range, and it is therefore possible to increase the sensitivity of the manifold pressure control when adjusted for lower manifold pressures. The pressure control device 10 may be adjusted so that at the various power requirements control will be as sensitive as possible for the stability of the power plant that exists at the power desired. The adjusting means 31 is regulated so that the vertical spring 30 will have the desired tension in conjunction with the tension of the springs 35 and 36 as adjusted by the screws 41 and 42 to give the desired control pressure together with the desired spring rate at the various power settings. The relation between the sensitivity of the device at the emergency or military power setting and at a particular reduced power setting may be determined by adjusting the relation between the rate of the spring 30, as determined by the setting of the spring plug 33 therein, and the rate of the springs 35 and 36, as determined by the settings of the spring plugs 43 and 44 with relation to those springs.

It will be noted that the lower ends of the springs 35 and 36 are pivoted in the member 20 at points substantially in line with the pivot for the levers 39 and 40 in the housing 11. Hence, it will be seen that pivoting the levers 39 and 40 in the housing 11 results in practically no change in length of the springs 35 and 36 and hence there is a minimum tendency for the spring to have a force of reaction through the levers 35 and 36 that will tend to position the adjusting lever 50 and cause a reactive force back to the manual control lever 125.

As previously pointed out, the leaf spring 55 associated with the member 20 engages the springs 35 and 36 when the manual control lever 125 is moved to the right for placing the levers 39 and 40 close to horizontal position. In this position the control device is adjusted for engine idling condition, and it is desirable that the waste gate valve 109 be opened regardless of any other condition. Engagement of the leaf spring 55 by the springs 35 and 36 will have the same effect on the member 20 as increased manifold pressure, and the slider 65 will be moved to a position with respect to the resistance 66 in which the waste gate valve 109 will be opened and the throttle valve 108 will be moved towards closed position. However, since the spring 55 is resilient, it will be possible to vary manually the position of the throttle valve 108 sufficiently to maintain engine operation.

The arrangement of the aneroid bellows 14 and the seal-off bellows 17 is such that increased altitude causes a response of the member 20 in the same direction as a decrease in manifold pressure. As a result, the device will call for slightly higher manifold pressure at higher altitudes. However, at increased altitudes the waste gate must be moved towards closed position in order to maintain desired manifold pressure. To do this, the slider 65 must be repositioned with respect to the resistance 66, and this can be done only by lowering the effective pressure in the chamber 12 to a value that will position the slider 65 on the resistance 66 to a position that will give the desired position of the waste gate valve 109. The effective diameter of the bellows 17 is chosen with respect to the effective diameter of the bellows 14 to compensate for this "droop" of the control system. Such compensation is most important at the maximum power setting. Since it is not possible to adjust the power setting beyond the maximum setting to compensate for droop in the system due to increased altitude, the bellows 17 and 14 have been selected to be of the proper effective diameters to eliminate the system droop at the maximum power setting.

While the pressure control device has been illustrated as of a type to be used to control the manifold pressure of an aircraft engine, it will be understood that it could be used equally well on other applications. For example, it would be possible to use the device described in any application where it is desired to control pressure, for example, steam pressure or water pressure. While the control means has been illustrated as a variable electrical resistance, it will be apparent that a simple switching means could be substituted therefor. Likewise, the control means actuated by the member 20 could be a valve for varying the flow of a fluid.

I claim as my invention:

1. In a pressure responsive device, in combination, an expansible chamber, a member movable by said chamber, control means actuated by said member, a spring opposing expansion of said chamber, a lever having a fixed pivot and being operatively connected to said spring to change the component of force of said spring opposing expansion of said chamber while maintaining the actual force of said spring substantially constant, and means for pivotally adjusting said lever.

2. In a pressure responsive device, in combination, an expansible chamber, a member movable by said chamber, control means actuated by said member, a first spring having a fixed support acting on said member, a second spring opposing expansion of said chamber, a lever having a fixed pivot and being operatively connected to said second spring to change the component of force of said second spring opposing expansion of said chamber while maintaining the actual force of said spring substantially constant and means for pivotally adjusting said lever.

3. In a pressure responsive device, in combination, an expansible chamber, a member movable by said chamber, control means actuated by said member, a first spring having a fixed support acting on said member, a second spring opposing expansion of said chamber, a lever having a fixed pivot and being operatively connected to said second spring to change the component of force of said second spring opposing expansion of said chamber while maintaining the actual force of said spring substantially constant, means for pivotally adjusting said lever, means for adjusting the force of said first spring, and means for adjusting the position of said second spring with respect to said lever.

4. In a pressure responsive device, in combination, a support, an expansible chamber carried by said support, a member movable by said chamber in a predetermined path, control means actuated by said member, a spring carried by said support for directly opposing expansion of said chamber, a second spring carried by said support and acting on said member, and means for changing the angle of the application of the force of said second spring with respect to the direction of movement of said member while maintaining the actual force of said spring substantially constant.

5. In a pressure responsive device, in combination, a support, an expansible chamber carried by said support, a member translatable by said chamber, control means actuated by said member, a pair of springs symmetrically located with respect to said member, one portion of each of said springs being connected to said member, and another portion of each of said springs being pivotally mounted in said support for varying symmetrically the spring component opposing expansion of said chamber while maintaining the actual force of said springs substantially constant.

6. In a pressure responsive device, in combination, an expansible chamber, a member movable by said chamber, control means actuated by said member, a first spring having a predetermined spring rate acting on said member, a second spring acting on said member, means for varying the effective spring rate of said second spring while maintaining the actual force of said second spring substantially constant, and means for adjusting the force of said first spring applied to said member.

7. In a pressure responsive device, in combination, a support, an expansible chamber carried by said support, a member translatable by said chamber, a pair of springs symmetrically disposed, with respect to said member and acting on said member, levers pivoted in said support on axes substantially in line with the connections of said springs to said member and normal to the movement of said member, said levers being operatively connected to said springs, means interconnecting said levers for causing simultaneous pivoting thereof while maintaining their symmetry with respect to said member, and means for adjusting said levers pivotally.

8. In a pressure responsive device, in combination, a support, an expansible chamber carried by said support, a member translatable by said chamber, a resistor carried by said support, means actuated by said member for varying the effective value of said resistor, springs on opposite sides of said member and conjointly acting on said member to oppose said chamber, levers pivoted in said support on axes substantially in line with the connections of said springs to said member, said levers being operatively connected to said springs, means interconnecting said levers for causing simultaneous pivoting thereof, and means for adjusting said levers pivotally.

9. In a control device, in combination, a condition responsive element, a control element positioned by movement of said condition responsive element, a spring having one portion acting on said condition responsive element and another portion connected to an adjustable abutment, said abutment being movable through a predetermined range for varying the force of said spring that acts on said condition responsive element, and a separate connection between said abutment and said condition responsive element effective only in a predetermined portion of the adjustable range of said abutment.

10. In a pressure responsive device, in combination, an expansible chamber having a first movable wall comprising an aneroid bellows, and having a second movable wall opposing said first wall and comprising a bellows of smaller diameter than said aneroid bellows subjected on its opposite side to ambient pressure, a member interconnecting said first and second movable walls and extending out of said chamber, control means actuated by said member, a spring opposing expansion of said chamber, a lever having a fixed pivot and being operatively connected to said spring to change the component of force of said spring opposing expansion of said chamber while maintaining the actual force of said spring substantially constant, and means for pivotally adjusting said lever.

11. In a pressure responsive device, in combination, a support, an expansible chamber carried by said support, a member movable by said chamber, control means actuated by said member, a spring acting on said member and opposing expansion of said chamber, a lever pivoted to said in said support and operatively connected to said spring to vary the component of the force of said spring effective to position said member, switching means carried by said support, a cam movable with said lever to actuate said switching means, means for angularly adjusting said cam in said lever about the axis of said lever to determine the position of said lever at which said switch is actuated, and means for pivotally adjusting said lever.

12. In a pressure responsive device, in combination, a support, an expansible chamber carried by said support, a member movable by said chamber, control means actuated by said member, a spring acting on said member and opposing expansion of said chamber, a lever pivoted in said support for varying the force of said spring on said member, switching means carried by said support, cam means for actuating said switching means, said cam means being carried by said lever and adjustable with respect thereto for varying the setting of said lever at which said switching means is actuated.

13. A device for applying an adjustable force to oppose a pressure responsive element comprising, a first spring adapted to act directly on the element, a second spring, and a lever operatively connected to said second spring and rotatable about an axis for changing the component of force of said second spring acting on the element while maintaining the actual force of said second spring substantially constant.

14. In a control device, in combination, a condition responsive element, a control element positioned by movement of said condition responsive element, a spring having one portion acting on said condition responsive element and another portion connected to an adjustable abutment, said abutment being movable through a predetermined range for varying the force of said spring that acts on said condition responsive element, and a second spring adapted to interconnect said abutment and said condition responsive element only when said abutment is located within a predetermined fractional portion of its adjustable range.

STEPHEN CRUM.

REFERENCES CITED

The following references are of record in the file of this patent:

UNITED STATES PATENTS

| Number | Name | Date |
| --- | --- | --- |
| 39,114 | Breroor | July 7, 1863 |
| 999,329 | Mehring | Aug. 1, 1911 |
| 1,344,340 | Fulton | June 22, 1920 |
| 2,170,744 | Adler | Aug. 22, 1939 |
| 2,182,123 | Grisdale | Dec. 5, 1939 |
| 2,203,523 | Cunningham | June 4, 1940 |
| 2,256,473 | De Giers | Sept. 23, 1941 |
| 2,283,378 | Liner | May 19, 1942 |
| 2,356,202 | Benjamin | Aug. 22, 1944 |